(12) United States Patent
Macey

(10) Patent No.: US 7,575,462 B2
(45) Date of Patent: Aug. 18, 2009

(54) ELECTRICAL RAIL COUPLER ASSEMBLY

(75) Inventor: Laurence David Macey, Tanilba Bay (AU)

(73) Assignee: New Macey Pty Limited, Tomago, New South Wales (AU)

( * ) Notice: Subject to any disclaimer, the term of this patent is extended or adjusted under 35 U.S.C. 154(b) by 164 days.

(21) Appl. No.: 11/256,541

(22) Filed: Oct. 21, 2005

(65) Prior Publication Data

US 2007/0093112 A1 Apr. 26, 2007

(51) Int. Cl.
*H01R 13/627* (2006.01)
(52) U.S. Cl. ...................................... 439/352
(58) Field of Classification Search ................. 439/352, 439/540.1, 49, 332, 497, 442–443, 676, 752, 439/544
See application file for complete search history.

(56) References Cited

U.S. PATENT DOCUMENTS 5,096,436 A * 3/1992 Noschese ..................... 29/876
5,658,166 A * 8/1997 Freeman et al. .......... 439/540.1
5,672,071 A * 9/1997 Ceru ........................... 439/353
6,884,099 B1 * 4/2005 Cannon ....................... 439/318
2001/0049219 A1 * 12/2001 Torii ........................... 439/352

* cited by examiner

*Primary Examiner*—Jean F Duverne
(74) *Attorney, Agent, or Firm*—Townsend and Townsend and Crew, LLP

(57) ABSTRACT

There is disclosed herein an electrical rail coupler assembly (1) to maintain in use electrical contact between adjacent railway carriages. The assembly (1) includes a pair of complementary coupler sub-assemblies (5) securable together in use to maintain electrical contact therebetween. Each coupler sub-assembly (5) includes a base (10) to be fixed to a respective one of the carriages. A body (15) is attached to the base (10) and at least one electrical plug portion (25) engages an electrical receptacle portion (26) of the other sub-assembly (5) so that the sub-assemblies (5) when secured together are electrically connected. The electrical portions (25, 26) are moved, into electrical contact engagement by relative movement, in a predetermined direction by at least one of the bodies (5) being movable in the direction relative to its associated base (10) to provide for engagement and disengagement of the plug and receptacle portions (25, 26). Securing means (30) extends between the bodies (15) to releasably secure the bodies (15) together with the plug and receptacle portions (25, 26) in electrical contact.

17 Claims, 8 Drawing Sheets

ELECTRICAL RAIL COUPLER ASSEMBLY

FIELD OF THE INVENTION

The present invention relates to railway trains and in particular to electrical rail coupler assemblies connecting the electrical power and controls between train carriages.

BACKGROUND OF THE INVENTION

A railway train consists of a number of carriages releasably secured together by a carriage coupler assembly. That coupler assembly can include a rack or pinion (link and pin-type couplers) retaining the carriages together during motion. Other types include automatic coupling assemblies which resemble a right-handed fist, wherein the jaw of the couplings is opened and when the carriages come together the coupling is locked closed. A lever lifts a locking key in either coupling to uncouple the carriages apart.

As railway trains have become more complicated, with electrical power and controls connecting one carriage to another, systems for coupling those power and control circuits have been needed. Those circuits typically allow remote control of the carriage doors, lighting, security systems and the like.

Existing electrical couplers are usually either cables or conduits with plugs at one end and hard-wired at the other end. The plug end couples to a receptacle on the adjoining carriage. Where existing systems are adopted, it is also necessary to provide a parking or dummy receptacle to hold the jumper when carriages are disconnected. Alternatively, it is possible to use receptacles at each end of the carriages and connect adjoining carriages with a double-plugged jumper.

Electrical railway couplers typically fail because they are used in harsh environments where there are severe vibrations, changes in temperature, acidity and humidity. Water and dirt commonly enter into the electrical contacts causing failure of the electrical circuits. Further, any coupler assembly must not be too heavy, bulky or difficult to fit, otherwise operators will resort to hammers, levers and other tools to force parts together, damaging sensitive componentary. Maintenance is also a significant issue in railway train systems and any assembly must be easy and inexpensive to maintain.

Existing systems based on plugs and receptacles are slow to disconnect and re-connect, particularly at night and during poor weather conditions. If they are left joined when the mechanical coupler between two carriages is released, significant damage can be caused to the electrical system because the cabling is stretched to breaking point as carriages are shunted. Looser jumpers can be lost, while if one end is disconnected and the other end left in place, the jumpers can be dragged along the ballast, smashing the electrical connectors.

Separate plugs and receptacles are bulky and the hanging catenaries of cables are vulnerable to shrapnel damage from flying ballast. Receptacle covers are often left open due to operator error, allowing further encrustation of electrical contacts with dirt, acidic and alkaline washing solutions, and water, snow and ice.

SUMMARY OF THE INVENTION

It is an object of the present invention to overcome or ameliorate some of the disadvantages of the prior art, or at least to provide a useful alternative.

There is first disclosed herein an electrical rail coupler assembly to maintain in use electrical contact between adjacent railway carriages, the assembly including a pair of complementary coupler sub-assemblies securable together in use to maintain the electrical contact therebetween, each coupler sub-assembly including:

a base to be fixed to a respective one of the carriages;

a body attached to the base;

at least one electrical plug portion to engage an electrical receptacle portion of the other sub-assembly so that the sub-assemblies when secured together are electrically connected;

wherein the electrical portions are moved, into electrical contact engagement by relative movement, in a predetermined direction by at least one of the bodies being movable in the direction relative to its associated base to provide for engagement and disengagement of the plug and receptacle portions; and securing means extending between the bodies to releasably secure the bodies together with the plug and receptacle portions in electrical contact.

Preferably, both bodies are movable in the direction relative to their associated base.

Preferably, at least one body includes positioning means to adjust the position of the body relative to the base.

Preferably, the positioning means includes a pin extending through an aperture in the body and movable in that direction, the pin being fixed to the base.

Preferably, each body includes an aperture to receive the electrical plug or receptacle portion.

Preferably, each body includes a plurality of apertures for receipt of a plurality of electrical plug or receptacle portions.

Preferably, the securing means includes a locking pin extending normal from one body for locking engagement with a complementary aperture located in the other body.

Preferably, the locking pin includes a threaded portion.

Preferably, the locking pin includes a handle.

Preferably, each electrical plug or receptacle portion is a sealed module.

Preferably, when the electrical plug and receptacle portions are in electrical contact engagement, the plug and receptacle portions are also in sealing engagement.

Preferably, each electrical plug and receptacle portion includes a means of keying the plug and receptacle portion, so that the corresponding plug and receptacle portions are, in use, always mated.

Preferably, each plug and receptacle portion is individually removable and replaceable without disturbing other plug and receptacle portions.

Preferably, all plug and receptacle portions are electrically grounded to the body for safe operation.

Preferably, all plug and receptacle portions are electrically grounded to each other for safe operation.

Preferably, if the mechanical coupler assembly between carriages fails or is improperly connected and the towing forces between carriages is taken by the electrical coupler assembly, the coupler assembly should separate by shearing pins in the screw handles and/or retaining collars so that the connector separates with a minimum of damage.

BRIEF DESCRIPTION OF THE DRAWINGS

A preferred embodiment of the invention will now be described, by way of example only, with reference to the accompanying drawings, wherein.

DESCRIPTION OF THE PREFERRED EMBODIMENTS

Figure 1:
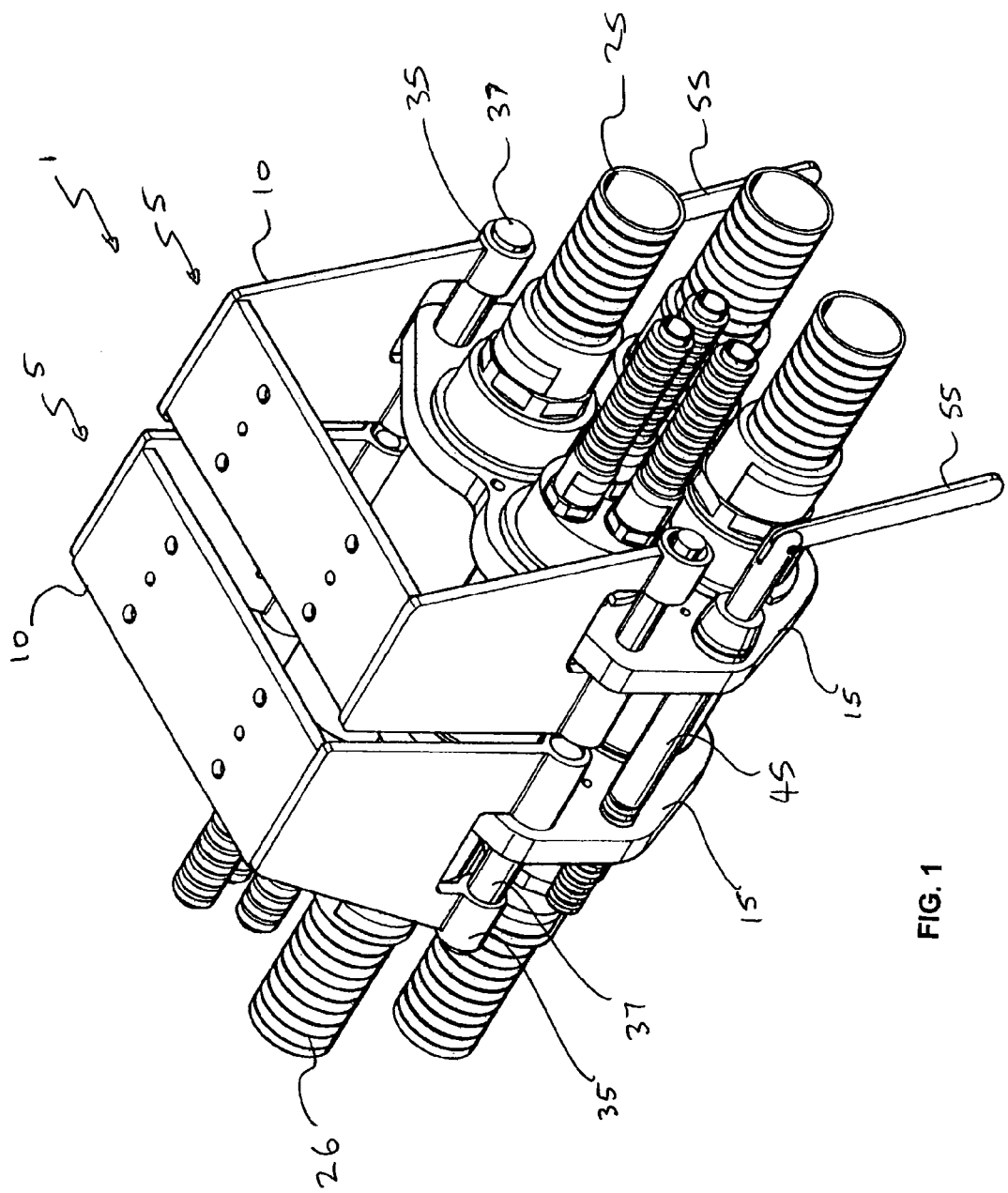
FIG. 1 is a perspective view showing a coupler assembly of an embodiment of the invention having first and second coupler sub-assemblies connected.
Figure 2:
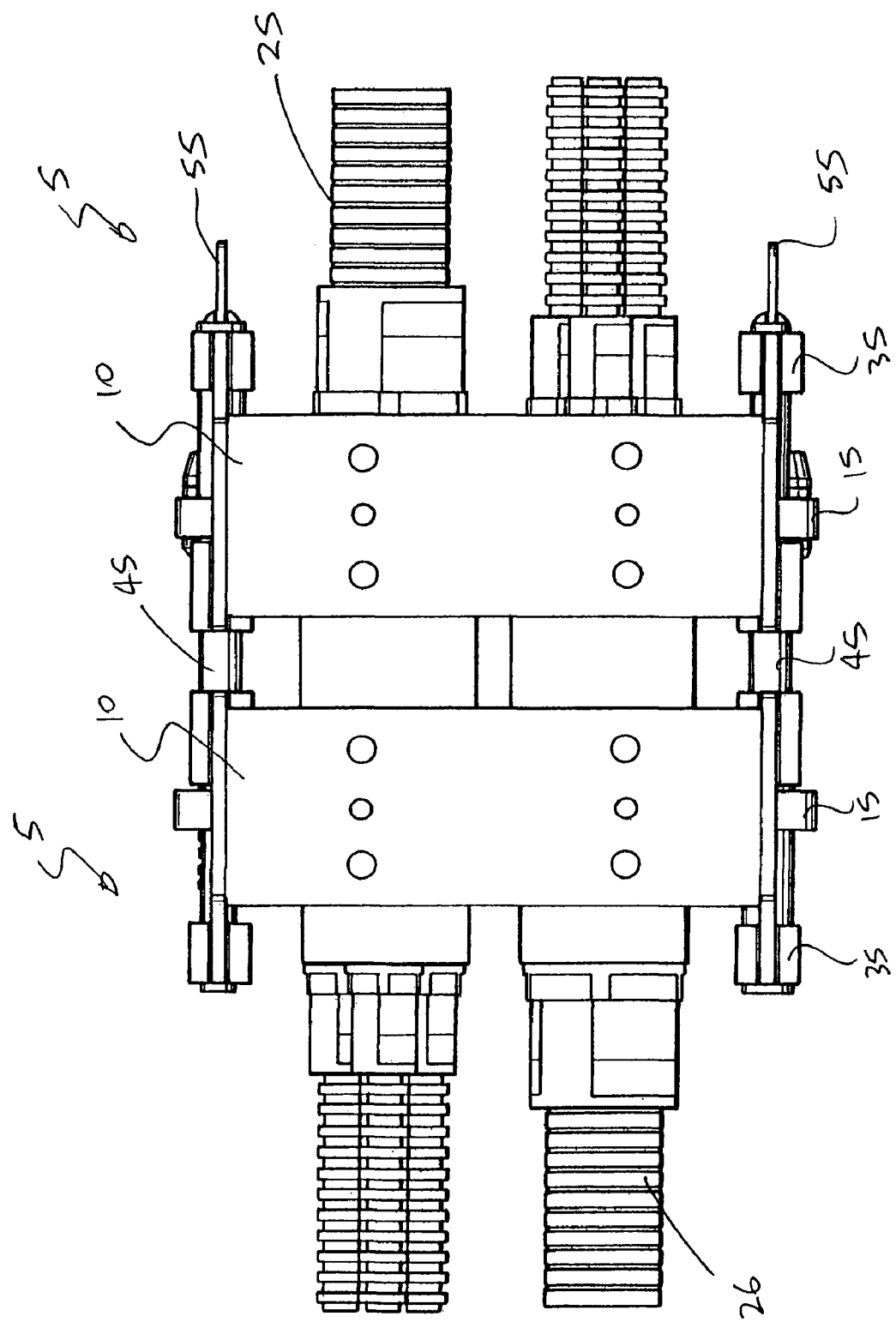
FIG. 2 is a plan view of FIG. 1.
Figure 3:
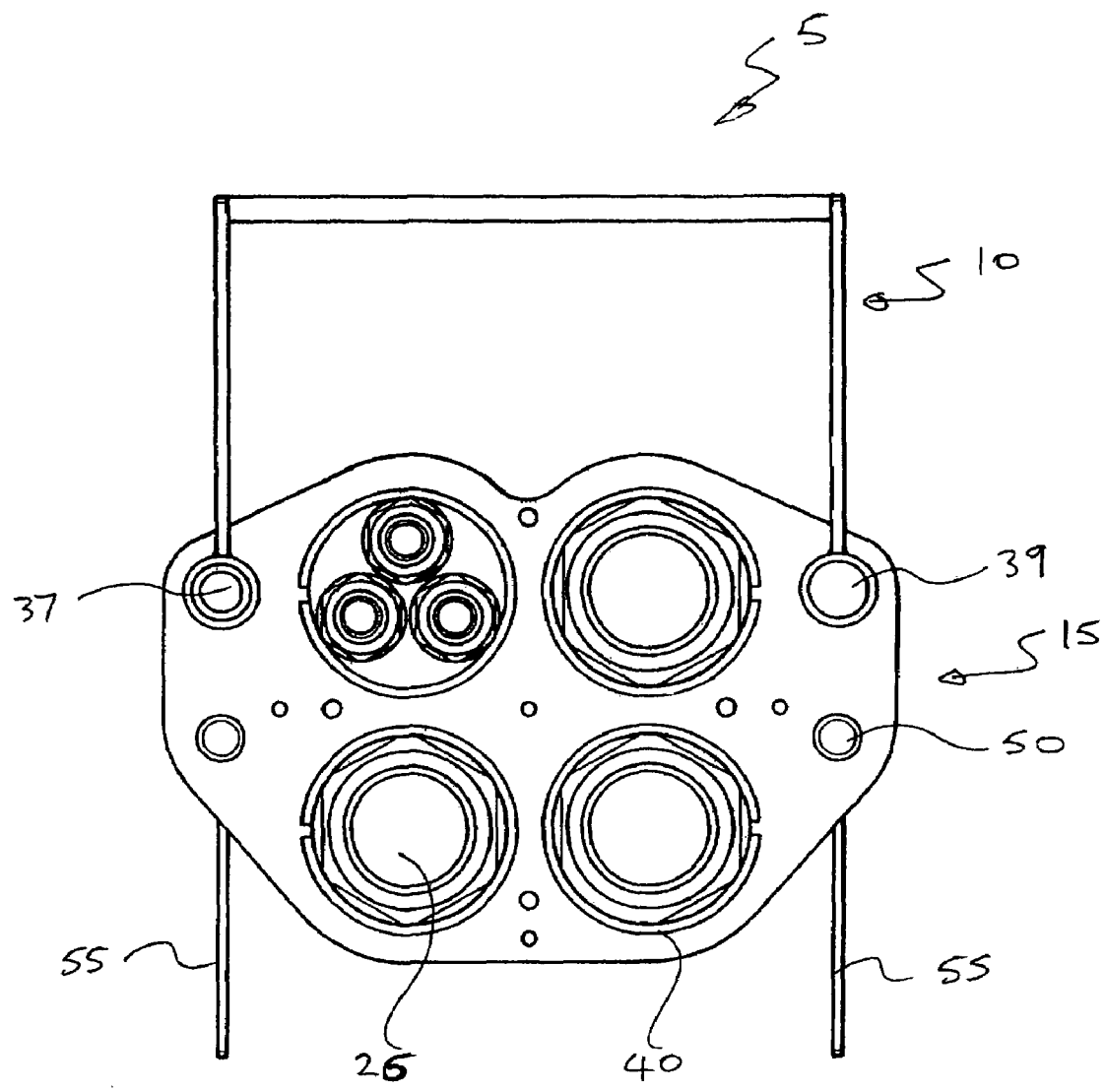
FIG. 3 is a left side view of FIG. 1.
Figure 4:
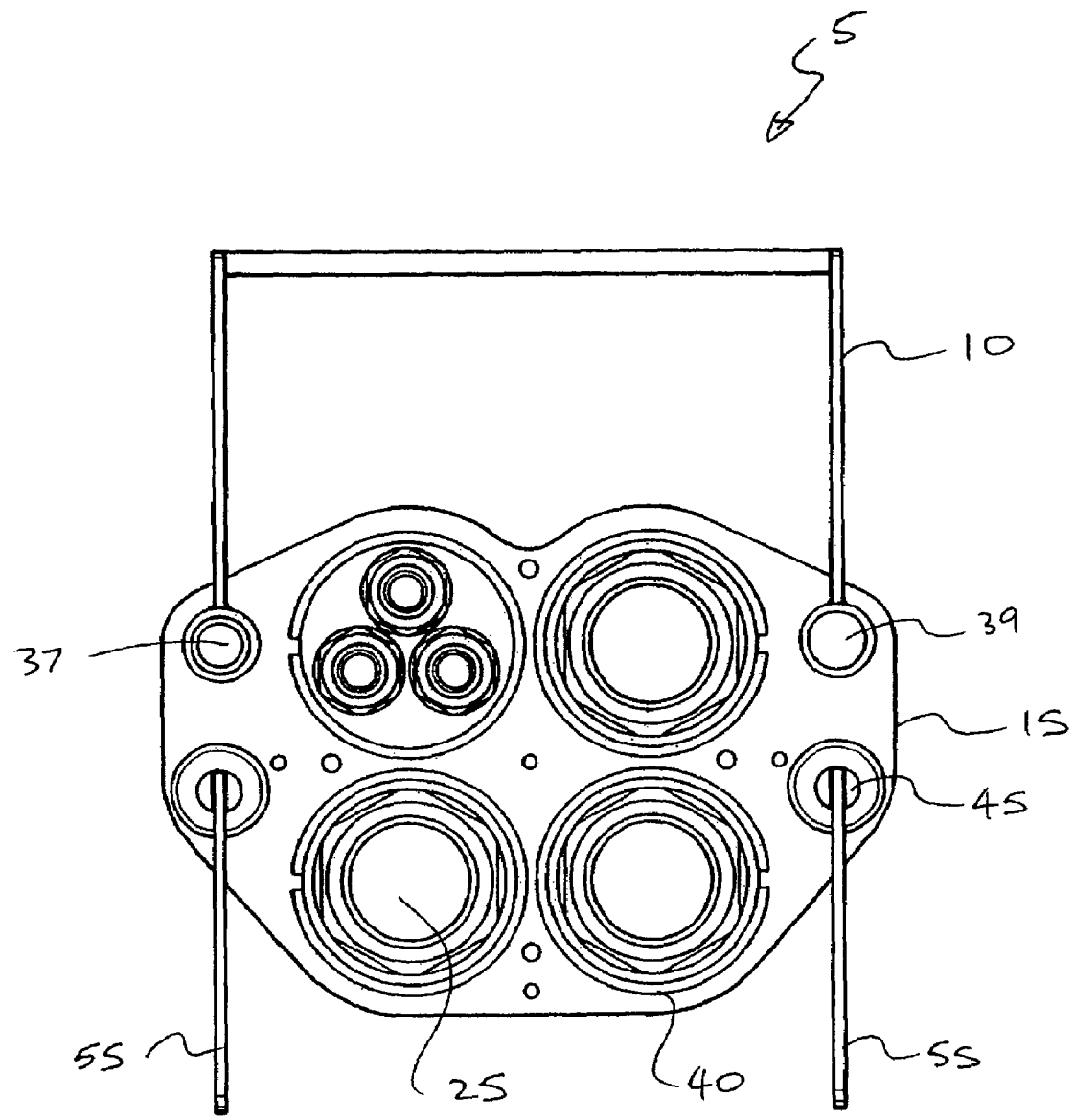
FIG. 4 is a right side view of FIG. 1.
Figure 5:
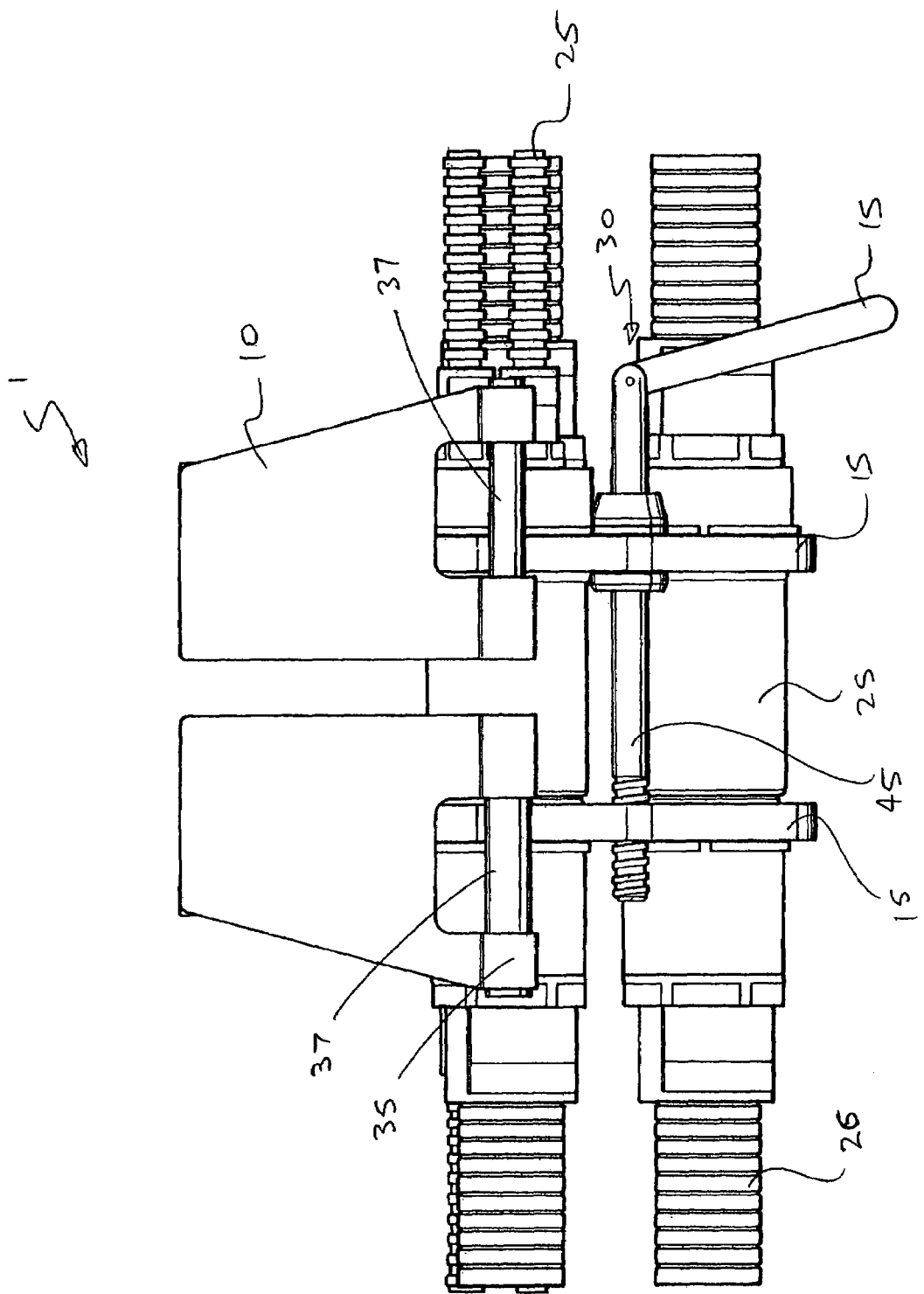
FIG. 5 is a front view of FIG. 1.
Figure 6:
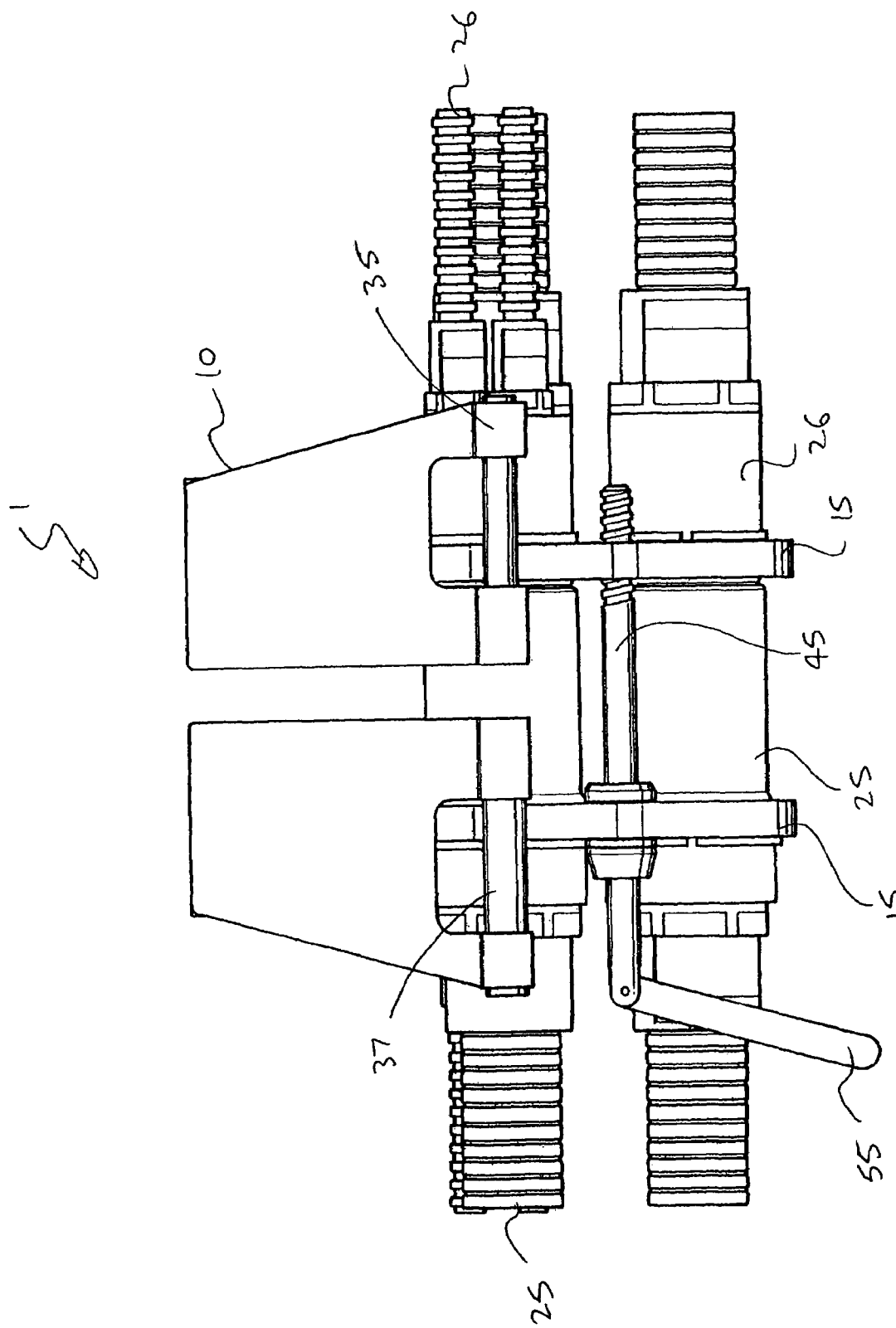
FIG. 6 is a rear view of FIG. 1.
Figure 7:
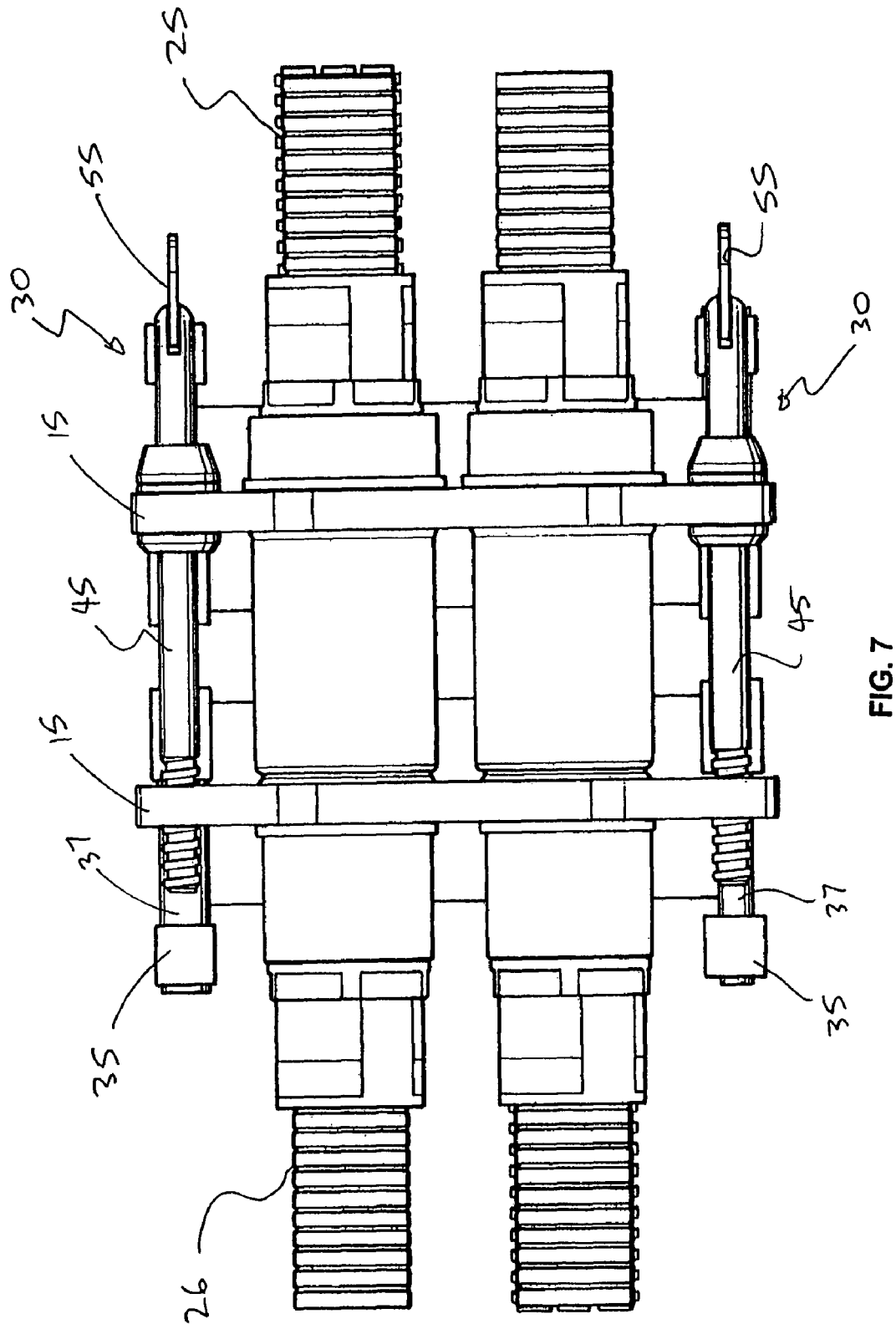
FIG. 7 is an inverted plan view of FIG. 1.

In the accompanying drawings, there is schematically depicted an electrical rail coupler assembly 1 to maintain in use electrical contact between adjacent railway carriages while excluding all water. The assembly 1 includes a pair of complementary sub-assemblies 5 securable together in use to maintain electrical contact and sealing engagement therebetween. Each electrical coupler sub-assembly 5 includes a base 10 to be fixed to a respective one of the carriages. A body 15 is attached to the base 10. The sub-assembly 5 also includes at least one electrical plug portion 25 to engage a complementary electrical receptacle portion 26 of the other sub-assembly 5 so that the sub-assemblies 5 when secured together are electrically and sealingly connected. The electrical portions 25, 26 are moved, into electrical contact engagement by relative movement, in a predetermined direction by at least one of the bodies 15 being movable in that direction relative to its associated base 10 to provide for engagement and disengagement of the electrical portions 25, 26. Securing means 30 extend between the bodies 15 to releasably secure the bodies 15 together with the electrical portions 25, 26 in electrical and sealing contact.

In the preferred form, both the bodies 15 are movable in the direction which is preferably normal to the base 10. At least one of the bodies 15 and preferably both include positioning means 35 to adjust the position of the bodies 15 relative to the respective base 10. The positioning means 35 includes a pin 37 extending through an aperture 39 in the body 15 and movable in that direction. The pin 37 is fixed to the base 10 as shown in the Figures. However, other positioning systems such as a pivot or hinge could be utilized. The body 15 also includes one or more apertures 40 to receive and secure corresponding electrical portions 25, 26 to the assembly 1.

In the preferred form, the assembly 1 can include more than one securing means 30 each including a locking pin 45 which is threaded at one end and extendable normal to the bodies 15 for locking engagement with a complementary aperture 50 located therein. The locking pin 45 could include a handle 55 at one end so that a user does not require any tools to secure the sub-assembly 5 together. The handle 55 could be pivoted as shown in the Figures or fixed.

The electrical portions 25, 26 are preferably sealed modules.

In use, two train carriages are mechanically coupled together and any dummy plates are removed from the electrical couplers. The couplers sub-assemblies 5 are slid together until the threaded ACME shafts or pins 45 are engaged in their corresponding sockets. The two threaded shafts 45 are turned in parallel by means of the hinged handles 55, drawing the bodies or plates 15 together and progressively engaging the plug modules 25 into the receptacle modules 26. Eventually, the ends of the plug and/or receptacle sleeves compress into rubber gaskets, rendering the entire connection waterproof against the ingress of external water or washing fluids.

Figure 8:
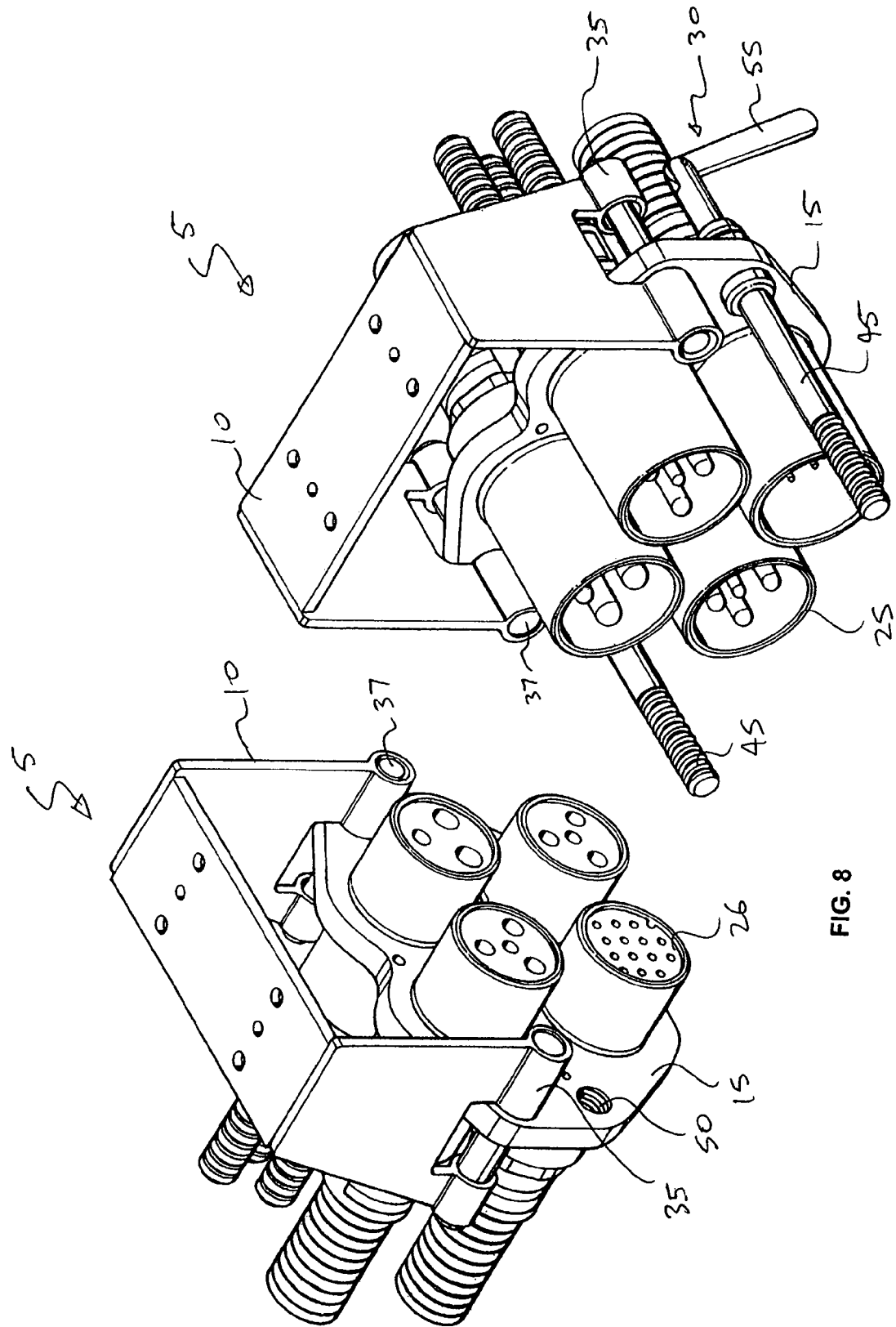
FIG. 8 is a perspective view of FIG. 1 with the sub-assemblies separated.

The electrical rail coupler assembly 1 in a preferred embodiment includes a fully sealed module assembly where each module can be individually replaced if damaged. One sub-assembly 5 would include the "male" fittings (see FIG. 8) and in the preferred form could be: one high-tension module containing two 16 mm diameter pins and one 14 mm diameter pin; two AC modules, each containing three 16 mm diameter phase pins and one 10 mm direction neutral pin; and one pilot module containing sixteen 4 mm diameter pins. The bodies 15 are preferably 24 mm thick mild steel machined holding plates having two locking pins or clamping screws 45. The corresponding complementary sub-assembly 5 would include the "female" fittings (see FIG. 8) and include: one high-tension module containing two 16 mm diameter multi-wire sockets and one 14 mm diameter multi-wire socket; two AC modules, each containing three 16 mm diameter phase multi-wire sockets and one 10 mm diameter neutral multi-wire socket; and one pilot module containing sixteen 4 mm diameter multi-wire sockets. It should however be noted that it is possible to save some pins and sockets by emitting two contacts in the high-tension modules. However, for simplicity and to reduce the number of different modules required for spare parts it is preferred to make all high-tensioned modules the same. Also, the number of pins can change depending upon the requirements in use. As discussed above, the sub-assembly 5 will be clamped together in use by the securing means 30, which can include a hardened-steel guide pin 45 which will slide inside a corresponding bush or aperture 50 located in the adjacent body 15. If required there could be more than one securing means 30. The locking pins 45 should be ACME threaded and fitted with hinged handles 55. When the locking pins or screws 45 are wound the body 15 will come together until the ends of the base 10 come together. The base 10 can include rubber gaskets or the like as contact points. Locking pins or screws 45 provide a secure lock of the mechanical advantage to overcome the insertion pressure between the pins and sockets. Likewise, winding the locking pins or screws 45 in the opposite direction causes the body or plates 15 to separate to overcome the extraction force between the pins and sockets. The handle 55 is left loose so that it will hang down and not work loose with vibration.

The system could also include "dummy" plates for use while carriages are being serviced. The "dummy" plate will fit securely over each of the sub-assemblies 5. Though a preferred embodiment of the base 10 has been shown in the Figures, it should be understood that many different base structures could be used depending upon the particular train carriage.

In the preferred form, and to provide the necessary strength and corrosion resistance, the following materials are presently proposed. Contact pins are silver-plated 147 alloy-grade copper with crimped connections for cable conductors; sockets are imported silver-plated multi-wire sockets with crimped connections for cable conductors; resin is a two-pack Kevlar-reinforced high-strength resin; cylindrical module bodies are machined from solid 316 marine-grade stainless steel tube bars or cast high-tensile bronze; and guide pins, sleeves and clamping screws are made from high-strength steel. The guide pins would be case-hardened for wear resistance, and retaining plates or bodies 15 would be machined from 24 mm thick plate steel that would be zinc passivated for corrosion protection.

The electrical portions 25, 26 can also include a two-pack epoxy resin containing Kevlar filler for increased strength and resilience. The resin is non-toxic with superior crack resistance, impact strength and waterproof characteristics. The resin should have a dielectric constant making it suitable for isolating electrical phases in high-voltage applications. It should chemically bond to cable sheath and conductor insulators ensuring there are no tensile stress concentrations at cable terminals. Further, the socket should be silver-plated multiple-wire designed. This would give lower insertion and withdrawal forces and improve the electrical continuity even when mating pins are slightly eccentric. Further, this minimizes minor arcing and pitting on the surface of the socket as the size of the sockets is dictated by the cable cross-sectional area that each can accommodate. For example, a 16 mm diameter socket accommodating a 95 mm² cable can carry a long-term nominal current of 340 amps and a maximum current of 460 amps. Likewise, a 14 mm socket attached to a 70 mm² cable can carry 280 and 400 amps respectively. The 10 mm neutral socket can accommodate 175 and 275 amps respectively. Finally, the size of the pilot sockets is dictated by the need for physical robustness rather than electrical capacity. A 4 mm socket will carry 55 and 80 amps respectively.

Each module or electrical portion 25, 26 should be fully waterproofed, being permanently bonded to the cables and conduits. Even if the conduit itself fills with water, no moisture would penetrate into the electrical connections with the electrical portion 25, 26. When clamped together the male and female connectors are sealed against water penetration by heavy-duty rubber gaskets 70. Further, in the preferred form the width of the assembly 1 would be approximately 363 mm, the depth approximately 266 mm and the length approximately 222 mm. This is significantly smaller than existing systems, which are typically 500 mm by 350 mm by 350 mm. The estimated mass of each half connector would be between about 27 kilograms to 30 kilograms. This is also significantly less than in existing systems, which are more than 40 kilograms.

Although the invention has been described with reference to specific examples, it will be appreciated by those skilled in the art that the invention may be embodied in many other forms.

The claims defining the invention are as follows:

1. An electrical rail coupler assembly to maintain in use electrical contact between adjacent railway carriages, said assembly comprising:
   a pair of complementary coupler sub-assemblies securable together in use to maintain said electrical contact therebetween, each said coupler sub-assembly including:
      a base adapted to be fixed to a respective one of said carriages;
      a body mounted on the base;
      at least one electrical plug portion to engage an electrical receptacle portion of the other sub-assembly so that the sub-assemblies when secured together are electrically connected, wherein the electrical portions are moved into electrical contact engagement by at least one of the bodies being movable in a predetermined direction relative to its associated base to provide for engagement and disengagement of said plug and receptacle portions; and
   securing means extending between the bodies to releasably secure the bodies together with the plug and receptacle portions in electrical contact.

2. The electrical rail coupler assembly according to claim 1, wherein both said bodies are movable in said direction relative to their associated base.

3. The electrical rail coupler assembly according to claim 1, wherein at least one said body includes positioning means to adjust the position of said body relative to said base.

4. The electrical rail coupler assembly according to claim 3, wherein said positioning means includes a pin extending through an aperture in said body and movable in said direction, said pin being fixed to said base.

5. The electrical rail coupler assembly according to claim 1, wherein each said body includes an aperture to receive said electrical plug or receptacle portion.

6. The electrical rail coupler assembly according to claim 5, wherein each said body includes a plurality of apertures for receipt of a plurality of electrical plug or receptacle portions.

7. The electrical rail coupler assembly according to claim 1, wherein said securing means includes a locking pin extending normal from one said body for locking engagement with a complementary aperture located in said other body.

8. The electrical rail coupler assembly according to claim 7, wherein said locking pin includes a threaded portion.

9. The electrical rail coupler assembly according to claim 7, wherein said locking pin includes a handle.

10. The electrical rail coupler assembly according to claim 1, wherein each said electrical plug or receptacle portion is a sealed module.

11. The electrical rail coupler assembly according to claim 1, wherein when said electrical plug and receptacle portions are in electrical contact engagement, the plug and receptacle portions are also in sealing engagement.

12. The electrical rail coupler assembly according to claim 1, wherein each said electrical plug and receptacle portion includes a means of keying the plug and receptacle portion, so that the corresponding plug and receptacle portions are, in use, always mated.

13. The electrical rail coupler assembly according to claim 1, wherein each plug and receptacle portion is individually removable and replaceable without disturbing other plug and receptacle portions.

14. The electrical rail coupler assembly according to claim 1, wherein all plug and receptacle portions are electrically grounded to the body for safe operation.

15. The electrical rail coupler assembly according to claim 1, wherein all plug and receptacle portions are electrically grounded to each other for safe operation.

16. The electrical rail coupler according to claim 1, whereby if the mechanical coupler assembly between carriages fails or is improperly connected and the towing forces between carriages is taken by the electrical coupler assembly, the coupler assembly should separate by shearing pins in the screw handles and/or retaining collars so that the connector separates with a minimum of damage.

17. An electrical rail coupler assembly to maintain in use electrical contact between adjacent railway carriages, said assembly comprising:
   a pair of complementary coupler sub-assemblies securable together in use to maintain said electrical contact therebetween, each said coupler sub-assembly including:
      a base to be fixed to a respective one of said carriages;
      a body attached to the base;
      at least one electrical plug portion to engage an electrical receptacle portion of the other sub-assembly so that the sub-assemblies when secured together are electrically connected, wherein the electrical portions are moved, into electrical contact engagement by relative movement, in a predetermined direction by at least one of the bodies being movable in said direction relative to its associated base to provide for engagement and disengagement of said plug and receptacle portions;
   securing means extending between the bodies to releasably secure the bodies together with the plug and receptacle portions in electrical contact; and
   wherein at least one said body includes positioning means to adjust the position of said body relative to said base, said positioning means including a pin extending through an aperture in said body and movable in said direction, said pin being fixed to said base.

* * * * *